US011438108B2

(12) United States Patent
Lin

(10) Patent No.: US 11,438,108 B2
(45) Date of Patent: Sep. 6, 2022

(54) METHOD FOR TRANSMITTING FEEDBACK RESPONSE INFORMATION AND RELATED PRODUCT

(71) Applicant: Guangdong OPPO Mobile Telecommunications Corp., Ltd., Guangdong (CN)

(72) Inventor: Yanan Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 551 days.

(21) Appl. No.: 16/338,582

(22) PCT Filed: Oct. 26, 2017

(86) PCT No.: PCT/CN2017/107873
§ 371 (c)(1),
(2) Date: Apr. 1, 2019

(87) PCT Pub. No.: WO2019/080059
PCT Pub. Date: May 2, 2019

(65) Prior Publication Data
US 2021/0328729 A1   Oct. 21, 2021

(51) Int. Cl.
*H04L 1/18* (2006.01)
*H04L 1/06* (2006.01)
(Continued)

(52) U.S. Cl.
CPC .......... *H04L 1/1896* (2013.01); *H04L 1/0643* (2013.01); *H04W 72/0446* (2013.01);
(Continued)

(58) Field of Classification Search
CPC ............... H04L 1/1896; H04L 1/0643; H04W 72/0446; H04W 72/1273; H04W 72/1257; H04W 72/1289
See application file for complete search history.

(56) References Cited

U.S. PATENT DOCUMENTS

2016/0338053 A1    11/2016  Park et al.
2019/0363840 A1*   11/2019  Wang .................... H04L 1/1822

FOREIGN PATENT DOCUMENTS

CN       102263617 A    11/2011
CN       103188061 A     7/2013
(Continued)

OTHER PUBLICATIONS

HARQ management and feedback 3GPP TSG RAN WG1 meeting NR#3, R1-1716005 Samsung Sep. 21, 2017 (Year: 2017).*
(Continued)

*Primary Examiner* — Rina C Pancholi
(74) *Attorney, Agent, or Firm* — Young Basile Hanlon & MacFarlane, P.C.

(57) ABSTRACT

A method for transmitting feedback response information and a related product are provided. The method includes: receiving, by a terminal, configuration information from a network device; determining, by the terminal, a largest number of pieces of feedback response information corresponding to one physical shared channel according to the configuration information; determining, by the terminal, a bit length of a first information field according to the largest number of pieces of the feedback response information; determining, by the terminal, a feedback response information sequence in a target time unit according to the first information field; and sending, by the terminal, the feedback response information sequence in the target time unit.

15 Claims, 6 Drawing Sheets

(51) Int. Cl.
*H04W 72/04* (2009.01)
*H04W 72/12* (2009.01)

(52) U.S. Cl.
CPC ... *H04W 72/1257* (2013.01); *H04W 72/1273* (2013.01); *H04W 72/1289* (2013.01)

(56) References Cited

FOREIGN PATENT DOCUMENTS

| | | |
|---|---|---|
| CN | 104253677 A | 12/2014 |
| RU | 2546564 C2 | 4/2015 |
| WO | 2012165795 A2 | 12/2012 |
| WO | 2014208924 A1 | 12/2014 |
| WO | 2016175007 A1 | 11/2016 |
| WO | 2017011086 A1 | 1/2017 |
| WO | WO-2018227600 A1 * 12/2018 ........... H04L 1/1854 |
| WO | 2019033384 A1 | 2/2019 |

OTHER PUBLICATIONS

Clarification on the Number of ACK/NACK bits on PUSCH when M=1 in TDD R1-113264 LG Electronics Oct. 14, 2011 (Year: 2011).*
Canadian First Examiners Report for CN Application 3074328 dated Apr. 14, 2021.
3GPP TSG RAN WG1 Meeting #91 R1-1719301; Reno, USA, Nov. 27 and Dec. 1, 2017.
English translation of CN First Office Action for CN Application 201780048027X dated Jun. 3, 2020.
First Russian Office Action and Translation dated Nov. 3, 2020.
3GPP TSG RAN WG1 Meeting #66bis; R1-113264; Zhuhai, China, Oct. 10-14, 2011.
Communication pursuant to Article 94(3) EPC, Examination for EP Application 17922070.2 dated Aug. 31, 2020.
3GPP TSG RAN WG1 Meeting #90bis; Prague, CZ, Oct. 9-13, 2017; R1-1719171.
3GPP TSG RAN WG1 Meeting #90bis; Prague, CZ, Oct. 9-13, 2017; R1-1718861.
3Gpp, TSG RAN WG1 Meeting NR#13; Nagoya, Japan; Sep. 18-21, 2017; R1-1716005.
3Gpp, TSG RAN WG1 Meeting #90bis; Prague, CZ; Oct. 9-13, 2017; R101718034.
3GPP TSG RAN WG1 Meeting 90bis; Prague, CZ; Oct. 9-13, 2017; R1-1718279.
3GPP TSG RAN WG1 Meeting #90bis; Prague, CZ; Oct. 9-13, 2017; R1-1718287.
Extended EP Search Report for EP 17922070.2 dated Nov. 11, 2019.
Singapore Invitation to Respond to Written Opinion for SG Application 11202001734X dated Oct. 25, 2021. (9 pages).
Indian Examination Report for IN Application 202017015849 dated Jul. 9, 2021. (6 pages).
Japanese Notice of Reasons for Refusal with English Translation for JP Application 2020519322 dated Aug. 31, 2021. (8 pages).
Extended European Search Report for EP Application 21213996.8 dated Mar. 14, 2022. (7 pages).
Chinese Frist Office Action with English Translation for CN Application 202110168059.1 dated Apr. 12, 2022. (12 pages).
Japanese Office Action with English Translation for JP Application 2020519322 dated Apr. 22, 2022. (12 pages).
Korean Office Action with English Translation for KR Application 1020207009830 dated May 26, 2022. (12 pages).
CATT, Remaining Details of PUCCH codebook, 3GPP TSG RAN WG1 Meeting #83, R1-156570, Nov. 15-22, 2015 (3 pages).

* cited by examiner

METHOD FOR TRANSMITTING FEEDBACK RESPONSE INFORMATION AND RELATED PRODUCT

CROSS-REFERENCE TO RELATED APPLICATION(S)

This application is a 371 application of International Application No. PCT/CN2017/107873, filed on Oct. 26, 2017, the entire disclosure of which is hereby incorporated by reference.

TECHNICAL FIELD

The present disclosure relates to the field of communication technologies, and particularly, relates to a method for transmitting feedback response information and a related product.

BACKGROUND

In a Hybrid Automatic Repeat Request (HARD) technology, a data receiver needs to feed back response information to a data transmitter to help the data transmitter determine whether data is received correctly. Usually, an Acknowledgement (ACK) is used to indicate correct reception, and a Negative-acknowledgement (NACK) is used to indicate incorrect reception. The response information may also be called ACK/NACK feedback information. In an Uplink (UL) direction of a 3rd Generation Partnership Project (3GPP) Evolved Universal Terrestrial Radio Access (E-UTRA) system, a user equipment feeds back response information of downlink data reception to a base station through a Physical Uplink Control Channel (PUCCH). The 3GPP E-UTRA system is also called a Long Term Evolution (LTE) system.

SUMMARY

Implementations of the present disclosure provide a method for transmitting feedback response information and a related product.

In a first aspect, an implementation of the present disclosure provides a method for transmitting feedback response information. The method includes:

receiving, by a terminal, configuration information from a network device;

determining, by the terminal, a largest number of pieces of feedback response information corresponding to one physical shared channel according to the configuration information;

determining, by the terminal, a bit length of a first information field according to the largest number of pieces of the feedback response information;

determining, by the terminal, a feedback response information sequence to be transmitted in a target time unit according to the first information field; and sending, by the terminal, the feedback response information sequence in the target time unit.

In a second aspect, an implementation of the present disclosure provides a method for transmitting feedback response information. The method includes:

sending, by a network device, configuration information to a terminal, wherein the configuration information is used for the terminal to determine a largest number of pieces of feedback response information corresponding to one physical shared channel, the largest number is used for determining a bit length of a first information field, and the first information field is used for determining a feedback response information sequence to be transmitted in a target time unit; and receiving, by the network device, the feedback response information sequence which is sent by the terminal in the target time unit.

In a third aspect, an implementation of the present disclosure provides a terminal. The terminal possesses functions of implementing acts of the terminal designed in the foregoing methods. The functions may be implemented by using hardware, or may be implemented by executing corresponding software through hardware. The hardware or software includes one or more modules corresponding to the foregoing functions. In a possible design, the terminal includes a processor. The processor is configured to support the terminal to execute a corresponding function in the foregoing methods. Moreover, the terminal may further include a transceiver. The transceiver is used for supporting communication between the terminal and network device. Moreover, the terminal may further include a memory. The memory is used for coupling to the processor. The memory stores program instructions and data that are necessary for the terminal.

In a fourth aspect, an implementation of the present disclosure provides a network device. The network device possesses functions of implementing acts of the network device designed in the foregoing methods. The functions may be implemented by using hardware, or may be implemented by executing corresponding software through hardware. The hardware or software includes one or more modules corresponding to the foregoing functions. In a possible design, the network device includes a processor. The processor is configured to support the network device to execute a corresponding function in the foregoing methods. Moreover, the network device may further include a transceiver. The transceiver is used for supporting communication between the terminal and network device. Moreover, the network device may further include a memory. The memory is used for coupling to the processor. The memory stores program instructions and data that are necessary for the network device.

In a fifth aspect, an implementation of the present disclosure provides a terminal. The terminal includes a processor, a memory, a communication interface, and one or more programs, wherein the one or more programs are stored in the memory and configured to be executed by the processor, and the program includes instructions for executing acts in any method of the first aspect of implementations of the present disclosure.

In a sixth aspect, an implementation of the present disclosure provides a network device. The network device includes a processor, a memory, a transceiver, and one or more programs, wherein the one or more programs are stored in the memory and configured to be executed by the processor, and the program includes instructions for executing acts in any method of the second aspect of implementations of the present disclosure.

In a seventh aspect, an implementation of the present disclosure further provides a computer readable storage medium. The computer readable storage medium stores computer programs for exchanging digital data. The computer programs enable a computer to execute all or part of acts as described in any method of the first aspect of implementations of the present disclosure.

In an eighth aspect, an implementation of the present disclosure further provides a computer readable storage medium. The computer readable storage medium stores computer programs for exchanging digital data. The computer programs enable a computer to execute all or part of acts as described in any method of the second aspect of implementations of the present disclosure.

In a ninth aspect, an implementation of the present disclosure further provides a computer program product. The computer program product includes a non-transitory computer-readable medium storing computer programs. The computer programs are operable to enable a computer to execute all or part of acts as described in any method of the first aspect of implementations of the present disclosure. The computer program product may be a software installation package.

In a tenth aspect, an implementation of the present disclosure further provides a computer program product. The computer program product includes a non-transitory computer-readable medium storing computer programs. The computer programs are operable to enable a computer to execute all or part of acts as described in any method of the second aspect of implementations of the present disclosure. The computer program product may be a software installation package.

BRIEF DESCRIPTION OF DRAWINGS

In the following, the accompanying drawings used for describing implementations or the prior art are briefly illustrated.

DETAILED DESCRIPTION

Figure 1:
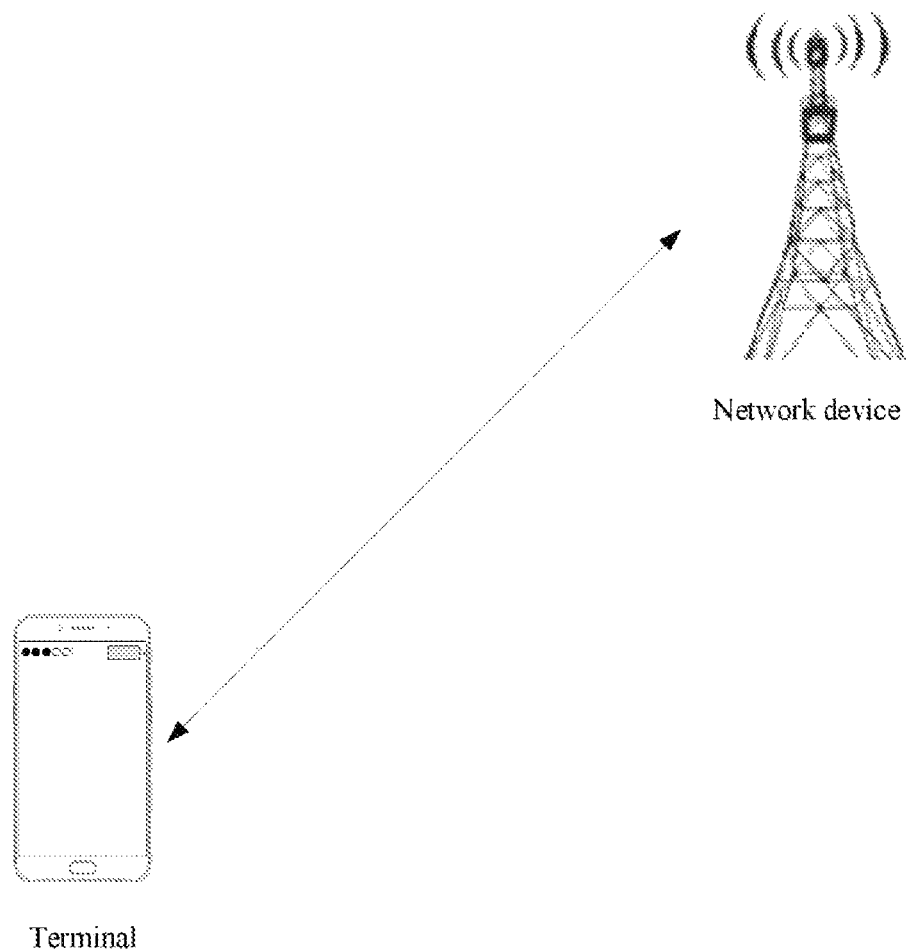
FIG. 1 is a diagram of a possible network architecture of a communication system according to an implementation of the present disclosure.

Firstly, some concepts and conventional operation manners related to implementations of the present disclosure are briefly described.

5th-Generation (5G) New Radio (NR) is a subject recently proposed in the 3rd Generation Partnership Project (3GPP) organization. With discussion of the new generation of 5G technology gradually goes deep, on the one hand, since the communication system is backward compatible, new technologies developed later tend to be compatible with technologies that have been standardized before; on the other hand, since 4G LTE system already has a large number of existing designs, for achieving compatibility, a lot of flexibility of 5G will be sacrificed, thereby the performance is decreased. Therefore, there are currently two parallel directions of the research in the 3GPP organization, wherein a technical discussion group that does not consider backward compatibility is called 5G NR.

In a research process of a 5G NR system, in order to improve transmission efficiency, the 5G NR system is determined to support feedback and retransmission based on a Code Block Group (CBG), where one code block group includes at least one coding block, and one transport block includes at least one code block group. A receiving end sends feedback response information for each code block group, a transmitting end only needs to retransmit code blocks which fail to be decoded in a code block group, and does not need to retransmit the whole transport block.

For a non-CBG based transmission mode, the 5G NR system is determined to support dynamic determination of the number of bits of feedback response information sequence of ACK/NACK feedback information. This method can improve transmission efficiency of downlink control information and avoid transmitting too much redundant information. However, for a Code Block Group-based (CBG-based) transmission mode that a terminal is configured to be in, if the terminal always performs feedback of ACK/NACK feedback information according to a maximum amount of CBGs supported, when the amount of data actually scheduled is less than a maximum amount of CBGs, too much redundant information will be transmitted, and transmission efficiency of downlink control information will be reduced. For the CBG-based transmission mode, there is not yet a specific scheme on how to realize dynamic determination of the number of bits of feedback response information sequence of ACK/NACK feedback information.

Aiming at the above problem, implementations of the present disclosure provide a method for transmitting feedback response information and a related product. In the method, the terminal firstly receives configuration information sent by a network device, secondly determines the largest number of pieces of feedback response information corresponding to one physical shared channel according the configuration information, and moreover determines a bit length of a first information field according to the largest number of pieces of the feedback response information. Moreover, the terminal further determines a feedback response information sequence to be transmitted in a target time unit according to the first information field, and finally sends the feedback response information sequence in the target time unit. Since the length of the first information field is determined according the largest number of pieces of feedback response information corresponding to each physical shared channel, redundant bits in the first information field can be reduced, the overhead for downlink control signaling can be decreased, and dynamic determination of feedback information sequence can be supported more efficiently.

In the following, the technical solutions in the implementations of the present disclosure are described with reference to the accompanying drawings.

Referring to FIG. 1, FIG. 1 illustrates a possible network architecture of an exemplary communication system according to an implementation of the present disclosure. The exemplary communication system, for example, may be a 5G NR system or other similar communication systems. The exemplary communication system specifically includes a network device and a terminal. When the terminal accesses a mobile communication network provided by the network device, a communication connection between the terminal and the network device is provided through a radio link. The mode of the communication connection may be a single-link mode, or a dual-link mode, or a multi-link mode. When the mode of the communication connection is the single-link mode, the network device may be an LTE base station or an NR base station (also known as a gNB base station). When the communication mode is the dual-link mode (specifically implemented by a Carrier Aggregation (CA) technology or implemented by multiple network devices), and the terminal is connected to multiple network devices, the multiple network devices may be a master base station and a secondary base station, data backhaul between the base stations can be performed by backhaul. The master base station may be an LTE base station, and the secondary base station may be an LTE base station. Or, the master base station may be an NR base station, and the secondary base station may be an LTE base station. Or, the master base station may be an NR base station, and the secondary base station may be an NR base station.

In implementations of the present disclosure, the terms "network" and "system" are often used alternately, but persons skilled in the art may understand the meanings thereof. The terminal related to implementations of the present disclosure may include various devices (such as handheld devices, vehicular devices, wearable devices, computing devices) with wireless connection capability, or other processing devices connected to a wireless modem, and various user equipment (UEs), mobile stations (MSs), terminal devices, and the like. For ease of description, the devices mentioned above are all referred to as terminal.

Figure 2:
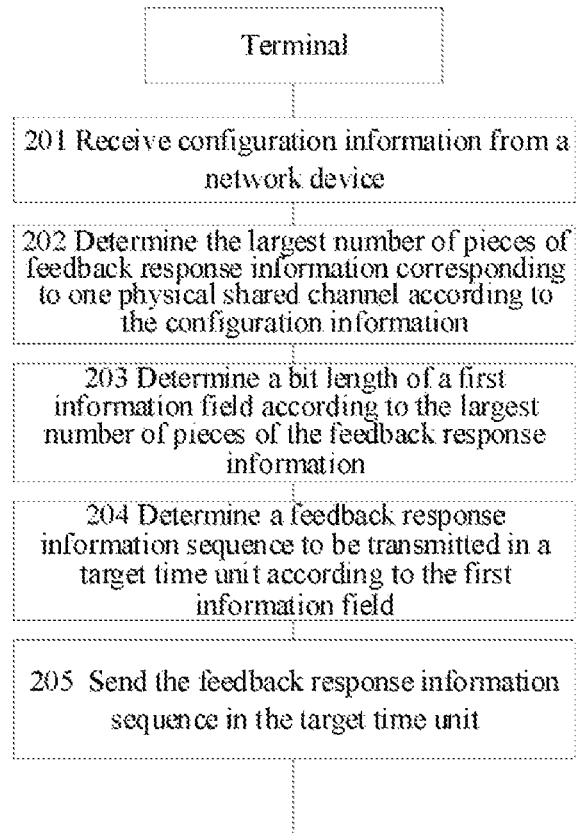
FIG. 2 is a schematic flowchart of a method for transmitting feedback response information according to an implementation of the present disclosure.

Referring to FIG. 2, FIG. 2 illustrates a method for transmitting feedback response information according to an implementation of the present disclosure. The method, applied to the above exemplary communication system, includes sections 201, 202, 203, 204 and 205.

In Section 201, a terminal receives configuration information from a network device.

The configuration information, for example, may be higher layer signaling in a communication system.

In Section 202, the terminal determines the largest number of pieces of feedback response information corresponding to one physical shared channel according to the configuration information.

The largest number of pieces of the feedback response information may correspond to the number of codewords and code block groups.

In Section 203, the terminal determines a bit length of a first information field according to the largest number of pieces of the feedback response information.

The terminal accomplishes operation of receiving and demodulating the first information field according to the determined bit length of the first information field. The first information field is used for determining a feedback response information sequence actually transmitted. The first information field, for example, may be a downlink allocation index (DAI).

In Section 204, the terminal determines a feedback response information sequence to be transmitted in a target time unit according to the first information field.

The time unit may be a time domain transmission unit such as a subframe, a timeslot, a symbol.

In Section 205, the terminal sends the feedback response information sequence in the target time unit.

It can be seen from the above that, in an implementation of the present disclosure, a terminal firstly receives configuration information sent by a network device, secondly determines the largest number of pieces of feedback response information corresponding to one physical shared channel according the configuration information, and moreover determines a bit length of a first information field according to the largest number of pieces of the feedback response information. Moreover, the terminal further determines a feedback response information sequence to be transmitted in a target time unit according to the first information field, and finally sends the feedback response information sequence in the target time unit. Since the length of the first information field is determined according the largest number of pieces of feedback response information corresponding to each physical shared channel, redundant bits in the first information field can be reduced, the overhead for downlink control signaling can be decreased, and dynamic determination of feedback information sequence can be supported more efficiently.

In a possible example, determining, by the terminal, the largest number of pieces of the feedback response information corresponding to one physical shared channel according to the configuration information, includes:

determining, by the terminal, that a multi-codeword transmission mode is used in downlink according to the configuration information; and determining, by the terminal, that the largest number of pieces of the feedback response information corresponding to one physical shared channel is a maximum codeword number under the multi-codeword transmission mode.

For example, the terminal determines that a dual-codeword transmission mode is used in downlink according to the configuration information; the terminal determines the largest number of pieces of the feedback response information corresponding to one physical shared channel is two.

As indicated above, in this example, the largest number of pieces of the feedback response information corresponding to one physical shared channel is determined by the maximum codeword number under the multi-codeword transmission mode, thereby the first information field can be determined dynamically according to the maximum codeword number. Therefore, redundant bits in the first information field can be reduced, the overhead for downlink control signaling can be decreased, and dynamic determination of feedback information sequence can be supported more efficiently.

In a possible example, the terminal uses a single-codeword transmission mode; determining, by the terminal, the largest number of pieces of the feedback response information corresponding to one physical shared channel according to the configuration information, includes:

determining, by the terminal, the largest number of code block groups included in one transport block according to the configuration information; and determining, by the terminal, that the largest number of pieces of the feedback response information corresponding to one physical shared channel is the largest number of the code block groups included in one transport block.

For example, the terminal uses a single-codeword transmission mode; the terminal determines that the largest number of the code block groups included in one transport block is 8, according to the configuration information; the terminal determines that the largest number of pieces of the feedback response information corresponding to one physical shared channel is 8.

As indicated above, in this example, the largest number of pieces of the feedback response information corresponding to one physical shared channel is determined by the largest number of the code block groups included in one transport block under the single-codeword transmission mode, thereby the first information field can be determined dynamically according to the largest number of the code block groups. Therefore, redundant bits in the first information field can be reduced, the overhead for downlink control signaling can be decreased, and dynamic determination of feedback information sequence can be supported more efficiently.

In a possible example, the terminal uses a multi-codeword transmission mode; determining, by the terminal, the largest number of pieces of the feedback response information corresponding to one physical shared channel according to the configuration information, includes:

determining, by the terminal, the largest number of code block groups included in each transport block according to the configuration information; and determining, by the terminal, that the largest number of pieces of the feedback response information corresponding to one physical shared channel is a sum of the largest number of the code block groups included in each transport block.

For example, the terminal uses a multi-codeword transmission mode; the terminal determines that the largest number of the code block groups included in each transport block are respectively 3 and 4 according to the configuration information; the terminal determines that the largest number of pieces of the feedback response information corresponding to one physical shared channel is 7.

As indicated above, in this example, the largest number of pieces of the feedback response information corresponding to one physical shared channel is determined by the largest number of the code block groups included in each transport block under the multi-codeword transmission mode, thereby the first information field can be determined dynamically according to the sum of the largest number of the code block groups included in each transport block. Therefore, redundant bits in the first information field can be reduced, the overhead for downlink control signaling can be decreased, and dynamic determination of feedback information sequence can be supported more efficiently.

In a possible example, determining, by the terminal, the largest number of pieces of the feedback response information corresponding to one physical shared channel according to the configuration information, includes:

determining, by the terminal, the largest number of code block groups included in one physical shared channel according to the configuration information; and determining, by the terminal, that the largest number of pieces of the feedback response information corresponding to one physical shared channel is the largest number of the code block groups included in one physical shared channel.

For example, the terminal determines that the largest number of the code block groups included in one physical shared channel is 8 according to the configuration information; the terminal determines that the largest number of pieces of the feedback response information corresponding to one physical shared channel is 8.

As indicated above, in this example, the largest number of pieces of the feedback response information corresponding to one physical shared channel is determined by the largest number of the code block groups included in one physical shared channel, thereby the first information field can be determined dynamically according to the largest number of the code block groups. Therefore, redundant bits in the first information field can be reduced, the overhead for downlink control signaling can be decreased, and dynamic determination of feedback information sequence can be supported more efficiently.

In a possible example, determining, by the terminal, the feedback response information sequence to be transmitted in the target time unit according to the first information field, includes:

determining, by the terminal, a bit length of the feedback response information sequence and/or a bit position, in the feedback response information sequence, of feedback response information corresponding to each physical shared channel.

As indicated above, in this example, by determining the bit length of the feedback response information sequence and/or the bit position, in the feedback response information sequence, of the feedback response information corresponding to each physical shared channel, correct transmission of the feedback response information can be ensured, thus correct transmission of the downlink data can be ensured.

In a possible example, determining, by the terminal, the bit length of the first information field according to the largest number of pieces of the feedback response information, includes:

if the largest number of pieces of the feedback response information corresponding to one physical shared channel is greater than or equal to a first threshold, determining that the bit length of the first information field is N bits, wherein N is a positive integer; and/or if the largest number of pieces of the feedback response information corresponding to one physical shared channel is greater than or equal to a second threshold, and less than or equal to a third threshold, determining that the bit length of the first information field is M bits, wherein M is a positive integer.

A relationship between N and the first threshold may be: $2^N >=$ the first threshold.

A relationship between M and the second threshold may be: $2^M >=$ the second threshold.

For example, assuming that the first threshold is 4, the terminal determines the bit length of the first information field is N=4, the terminal further receives network configuration, determines that the largest number of pieces of feedback response information corresponding to one physical Downlink Control Channel (PDCCH) is 8, and determines the bit lengths of counter DAI and total DAI of the first information field in downlink control signaling are 4 bits respectively, and the terminal may perform an operation of receiving and demodulating the first information field. The total DAI is used for determining the bit length of the feedback response information sequence, and the counter DAI is used for determining a bit position, in feedback response information sequence, of feedback response information corresponding to each PDSCH.

For another example, when the terminal receives network configuration, after the terminal determines the largest number of pieces of feedback response information corresponding to one PDCCH, the length(s) of information field(s) of counter DAI and/or total DAI can be determined respectively according to the corresponding relationship shown in the following table, thereby the terminal performs an operation of receiving and demodulating the first information field. The total DAI is used for determining the bit length of the feedback response information sequence, and the counter DAI is used for determining a bit position, in feedback response information sequence, of feedback response information corresponding to each PDSCH.

| The second threshold | The third threshold | M |
|---|---|---|
| 1 | 2 | 2 |
| 3 | 5 | 3 |
| 6 | 8 | 4 |

In a possible example, a default value for the bit length of the first information field is T bits, wherein T is a positive integer. When the bit length of the first information field is N bits, T is less than or equal to N. When the bit length of the first information field is M bits, T is less than or equal to M.

For example, before the terminal enables the function of adjusting the lengths of information fields of the counter DAI and total DAI, the default lengths of the information fields of the counter DAI and the total DAI are 2 bits respectively.

As indicated above, in this example, during processes of initial access, re-configuration and so on, the default value can ensure that the terminal works normally.

In a possible example, the first information field is a downlink allocation index (DAI) in downlink control signaling. The DAI includes a total DAI and a counter DAI. The total DAI is used for determining a total bit length of the feedback response information sequence. The counter DAI is used for determining a physical downlink shared channel scheduled by downlink control signaling or a bit position, in the feedback response information sequence, of feedback response information corresponding to the downlink control signaling.

Figure 3:
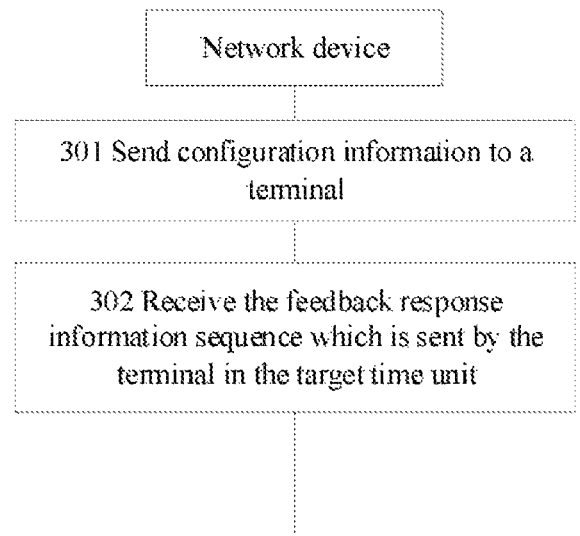
FIG. 3 is a schematic flowchart of another method for transmitting feedback response information according to an implementation of the present disclosure.

Consistent with the implementation shown in FIG. 2, referring to FIG. 3, FIG. 3 illustrates another method for transmitting feedback response information according to an implementation of the present disclosure. The method, applied to the above exemplary communication system, includes sections 301, and 302.

In section 301, a network device sends configuration information to a terminal, the configuration information is used for the terminal to determine the largest number of pieces of feedback response information corresponding to one physical shared channel, the largest number is used for determining a bit length of a first information field, and the first information field is used for determining a feedback response information sequence to be transmitted in a target time unit.

In section 302, the network device receives the feedback response information sequence which is sent by the terminal in the target time unit.

It can be seen from the above that, in an implementation of the present disclosure, a network device firstly sends configuration information to a terminal, the configuration information is used for the terminal to determine the largest number of pieces of feedback response information corresponding to one physical shared channel, the largest number is used for determining a bit length of a first information field, and the first information field is used for determining a feedback response information sequence to be transmitted in a target time unit. Finally, the network device receives the feedback response information sequence which is sent by the terminal in the target time unit. Since the length of the first information field is determined according the largest number of pieces of feedback response information corresponding to each physical shared channel, redundant bits in the first information field can be reduced, the overhead for downlink control signaling can be decreased, and dynamic determination of feedback information sequence can be supported more efficiently.

In a possible example, the configuration information is used for the terminal to determine that a multi-codeword transmission mode is used in downlink, and to determine that the largest number of pieces of the feedback response information corresponding to one physical shared channel is a maximum codeword number under the multi-codeword transmission mode.

In a possible example, the terminal uses a single-codeword transmission mode; the configuration information is used for the terminal to determine the largest number of code block groups included in one transport block, and to determine that the largest number of pieces of the feedback response information corresponding to one physical shared channel is the largest number of the code block groups included in one transport block.

In a possible example, the terminal uses a multi-codeword transmission mode; the configuration information is used for the terminal to determine the largest number of code block groups included in each transport block, and to determine that the largest number of pieces of the feedback response information corresponding to one physical shared channel is a sum of the largest number of the code block groups included in each transport block.

In a possible example, the configuration information is used for the terminal to determine the largest number of code block groups included in one physical shared channel, and to determine that the largest number of pieces of the feedback response information corresponding to one physical shared channel is the largest number of the code block groups included in one physical shared channel.

In a possible example, the first information field is specifically used for determining a bit length of the feedback response information sequence in a target time unit and/or a bit position, in the feedback response information sequence, of feedback response information corresponding to each physical shared channel.

In a possible example, if the largest number of pieces of the feedback response information corresponding to one physical shared channel is greater than or equal to a first threshold, the bit length of the first information field is N bits, wherein N is a positive integer; and/or if the largest number of pieces of the feedback response information corresponding to one physical shared channel is greater than or equal to a second threshold, and less than or equal to a third threshold, the bit length of the first information field is M bits, wherein M is a positive integer.

In a possible example, a default value for the bit length of the first information field is T bits, wherein T is a positive integer. When the bit length of the first information field is N bits, T is less than or equal to N. When the bit length of the first information field is M bits, T is less than or equal to M.

In a possible example, the first information field is a downlink allocation index (DAI) in downlink control signaling.

In a possible example, the DAI includes a total DAI and a counter DAI. The total DAI is used for determining a total bit length of the feedback response information sequence. Each counter DAI is used for determining a physical downlink shared channel scheduled in downlink control signaling or a bit position, in the feedback response information sequence, of feedback response information corresponding to downlink control signaling.

Figure 4:
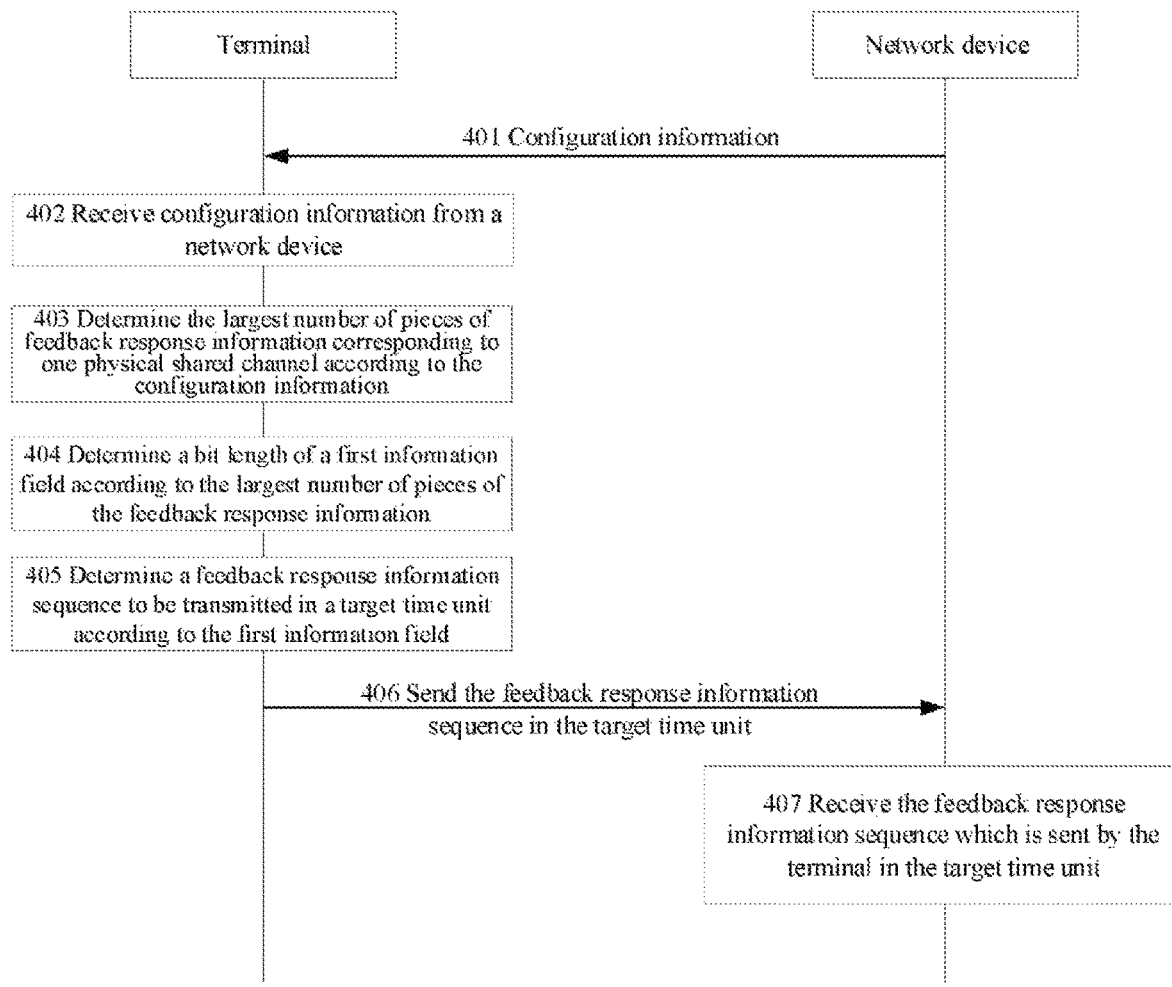
FIG. 4 is a schematic flowchart of another method for transmitting feedback response information according to an implementation of the present disclosure.

Consistent with the implementations shown in FIG. 2 and FIG. 3, referring to FIG. 4, FIG. 4 illustrates a method for transmitting feedback response information according to an implementation of the present disclosure. The method, applied to the above exemplary communication system, includes sections 401, 402, 403, 404, 405, 406 and 407.

In section 401, a network device sends configuration information to a terminal, the configuration information is used for the terminal to determine the largest number of pieces of feedback response information corresponding to one physical shared channel, the largest number is used for determining a bit length of a first information field, and the first information field is used for determining a feedback response information sequence to be transmitted in a target time unit.

In Section 402, a terminal receives configuration information from a network device.

In Section 403, the terminal determines the largest number of pieces of feedback response information corresponding to one physical shared channel according to the configuration information.

In Section 404, the terminal determines a bit length of a first information field according to the largest number of pieces of the feedback response information.

In Section 405, the terminal determines a feedback response information sequence to be transmitted in a target time unit according to the first information field.

In section 406, the terminal sends the feedback response information sequence in the target time unit.

In section 407, the network device receives the feedback response information sequence which is sent by the terminal in the target time unit.

It can be seen from the above that, in the implementation of the present disclosure, since the length of the first information field is determined according the largest number of pieces of feedback response information corresponding to each physical shared channel, redundant bits in the first information field can be reduced, the overhead for downlink control signaling can be decreased, and dynamic determination of feedback information sequence can be supported more efficiently.

Figure 5:
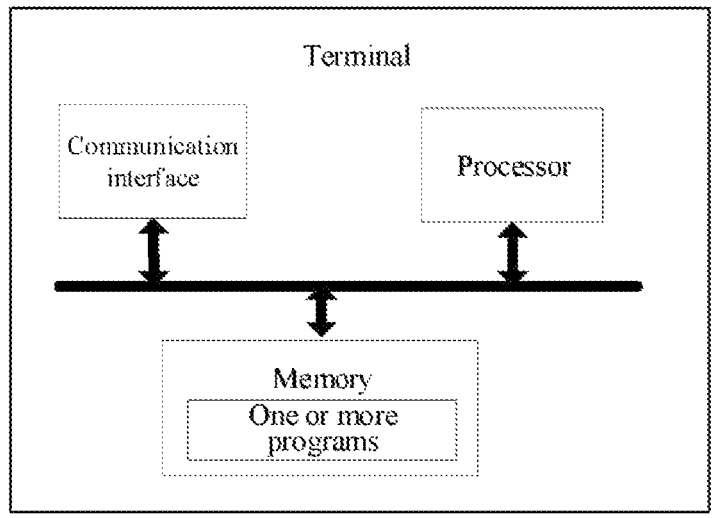
FIG. 5 is a schematic structural diagram of a terminal according to an implementation of the present disclosure.

Consistent with the above implementation, referring to FIG. 5, FIG. 5 is a schematic structural diagram of a terminal according to an implementation of the present disclosure. As shown in FIG. 5, the terminal includes: a processor, a memory, a communication interface, and one or more programs, wherein the one or more programs are stored in the memory and configured to be executed by the processor, and the program includes instructions for performing the following acts:

receiving configuration information from a network device;

determining the largest number of pieces of feedback response information corresponding to one physical shared channel according to the configuration information;

determining a bit length of a first information field according to the largest number of pieces of the feedback response information;

determining a feedback response information sequence to be transmitted in a target time unit according to the first information field; and sending the feedback response information sequence in the target time unit.

It can be seen from the above that, in an implementation of the present disclosure, a terminal firstly receives configuration information sent by a network device, secondly determines the largest number of pieces of feedback response information corresponding to one physical shared channel according the configuration information, and moreover determines a bit length of a first information field according to the largest number of pieces of the feedback response information. Moreover, the terminal further determines a feedback response information sequence to be transmitted in a target time unit according to the first information field, and finally sends the feedback response information sequence in the target time unit. Since the length of the first information field is determined according the largest number of pieces of feedback response information corresponding to each physical shared channel, redundant bits in the first information field can be reduced, the overhead for downlink control signaling can be decreased, and dynamic determination of feedback information sequence can be supported more efficiently.

In a possible example, in an aspect of determining the largest number of pieces of feedback response information corresponding to one physical shared channel according to the configuration information, the instructions in the program are specifically used for executing the following operations: determining that a multi-codeword transmission mode is used in downlink according to the configuration information; and determining that the largest number of pieces of the feedback response information corresponding to one physical shared channel is a maximum codeword number under the multi-codeword transmission mode.

In a possible example, the terminal uses a single-codeword transmission mode; in an aspect of determining the largest number of pieces of feedback response information corresponding to one physical shared channel according to the configuration information, the instructions in the program are specifically used for executing the following operations: determining the largest number of code block groups included in one transport block according to the configuration information; and determining that the largest number of pieces of the feedback response information corresponding to one physical shared channel is the largest number of the code block groups included in one transport block.

In a possible example, the terminal uses the multi-codeword transmission mode; in an aspect of determining the largest number of pieces of feedback response information corresponding to one physical shared channel according to the configuration information, the instructions in the program are specifically used for executing the following operations: determining the largest number of code block groups included in each transport block according to the configuration information; and determining that the largest number of pieces of the feedback response information corresponding to one physical shared channel is a sum of the largest number of the code block groups included in each transport block.

In a possible example, in an aspect of determining the largest number of pieces of feedback response information corresponding to one physical shared channel according to the configuration information, the instructions in the program are specifically used for executing the following operations: determining the largest number of code block groups included in one physical shared channel according to the configuration information; and determining that the largest number of pieces of the feedback response information corresponding to one physical shared channel is the largest number of the code block groups included in one physical shared channel.

In a possible example, in an aspect of determining the feedback response information sequence to be transmitted in the target time unit according to the first information field, the instructions in the program are specifically used for executing the following operations: determining a bit length of the feedback response information sequence and/or a bit position, in the feedback response information sequence, of feedback response information corresponding to each physical shared channel.

In a possible example, in an aspect of determining the bit length of the first information field according to the largest number of pieces of the feedback response information, the instructions in the program are specifically used for executing the following operations: if the largest number of pieces of the feedback response information corresponding to one physical shared channel is greater than or equal to a first threshold, determining that the bit length of the first information field is N bits, wherein N is a positive integer; and/or if the largest number of pieces of the feedback response information corresponding to one physical shared channel is greater than or equal to a second threshold, and less than or equal to a third threshold, determining that the bit length of the first information field is M bits, wherein M is a positive integer.

In a possible example, a default value for the bit length of the first information field is T bits, wherein T is a positive integer. When the bit length of the first information field is N bits, T is less than or equal to N. When the bit length of the first information field is M bits, T is less than or equal to M.

In a possible example, the first information field is a downlink allocation index (DAI) in downlink control signaling.

In a possible example, the DAI includes a total DAI and a counter DAI. The total DAI is used for determining a total bit length of the feedback response information sequence. The counter DAI is used for determining a physical downlink shared channel scheduled by downlink control signaling or a bit position, in the feedback response information sequence, of feedback response information corresponding to the downlink control signaling.

Figure 6:
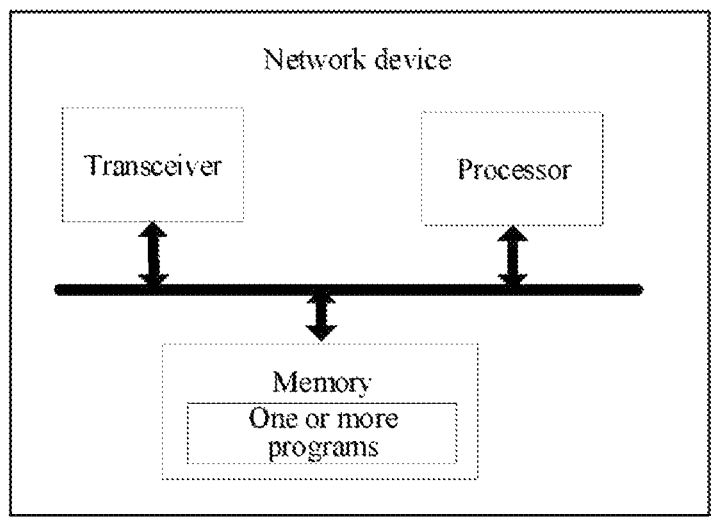
FIG. 6 is a schematic structural diagram of a network device according to an implementation of the present disclosure.

Consistent with the above implementation, referring to FIG. 6, FIG. 6 is a schematic structural diagram of a network device according to an implementation of the present disclosure. As shown in FIG. 6, the terminal includes: a processor, a memory, a transceiver, and one or more programs, wherein the one or more programs are stored in the memory and configured to be executed by the processor, and the program includes instructions for performing the following acts:

sending configuration information to a terminal, wherein the configuration information is used for the terminal to determine the largest number of pieces of feedback response information corresponding to one physical shared channel, the largest number is used for determining a bit length of a first information field, and the first information field is used for determining a feedback response information sequence to be transmitted in a target time unit; and receiving the feedback response information sequence which is sent by the terminal in the target time unit.

It can be seen from the above that, in an implementation of the present disclosure, a network device firstly sends configuration information to a terminal, the configuration information is used for the terminal to determine the largest number of pieces of feedback response information corresponding to one physical shared channel, the largest number is used for determining a bit length of a first information field, and the first information field is used for determining a feedback response information sequence to be transmitted in a target time unit. Finally, the network device receives the feedback response information sequence which is sent by the terminal in the target time unit. Since the length of the first information field is determined according the largest number of pieces of feedback response information corresponding to each physical shared channel, redundant bits in the first information field can be reduced, the overhead for downlink control signaling can be decreased, and dynamic determination of feedback information sequence can be supported more efficiently.

In a possible example, the configuration information is used for the terminal to determine that a multi-codeword transmission mode is used in downlink, and to determine that the largest number of pieces of the feedback response information corresponding to one physical shared channel is a maximum codeword number under the multi-codeword transmission mode.

In a possible example, the terminal uses a single-codeword transmission mode; the configuration information is used for the terminal to determine the largest number of code block groups included in one transport block, and to determine that the largest number of pieces of the feedback response information corresponding to one physical shared channel is the largest number of the code block groups included in one transport block.

In a possible example, the terminal uses a multi-codeword transmission mode; the configuration information is used for the terminal to determine the largest number of code block groups included in each transport block, and to determine that the largest number of pieces of the feedback response information corresponding to one physical shared channel is a sum of the largest number of the code block groups included in each transport block.

In a possible example, the configuration information is used for the terminal to determine the largest number of code block groups included in one physical shared channel, and to determine that the largest number of pieces of the feedback response information corresponding to one physical shared channel is the largest number of the code block groups included in one physical shared channel.

In a possible example, the first information field is specifically used for determining a bit length of the feedback response information sequence in a target time unit and/or a bit position, in the feedback response information sequence, of feedback response information corresponding to each physical shared channel.

In a possible example, if the largest number of pieces of the feedback response information corresponding to one physical shared channel is greater than or equal to a first threshold, the bit length of the first information field is N bits, wherein N is a positive integer; and/or if the largest number of pieces of the feedback response information corresponding to one physical shared channel is greater than or equal to a second threshold, and less than or equal to a third threshold, the bit length of the first information field is M bits, wherein M is a positive integer.

In a possible example, a default value for the bit length of the first information field is T bits, wherein T is a positive integer. When the bit length of the first information field is N bits, T is less than or equal to N. When the bit length of the first information field is M bits, T is less than or equal to M.

In a possible example, the first information field is a downlink allocation index (DAI) in downlink control signaling.

In a possible example, the DAI includes a total DAI and a counter DAI. The total DAI is used for determining a total bit length of the feedback response information sequence. Each counter DAI is used for determining a physical downlink shared channel scheduled in downlink control signaling or a bit position, in the feedback response information sequence, of feedback response information corresponding to the downlink control signaling.

The foregoing describes the solution provided in the implementation of the present disclosure mainly from a perspective of interaction between network elements. It can be understood that the terminal and the network device include corresponding hardware structures and/or software modules for performing the functions, so as to implement the foregoing functions. A person skilled in the art should easily understand that, in combination with units and algorithm acts in examples described with reference to the implementations disclosed in this document, the present disclosure may be implemented by hardware or a combination of hardware and computer software. Whether a function is performed by hardware or computer software driving hardware depends on a particular application and a design constraint condition of the technical solution. A person skilled in the art may use different methods to implement the described functions for each particular application, but it should not be considered that such a realization goes beyond the scope of the present disclosure.

Division for functional units can be performed for the terminal and network device in the implementations of the present disclosure according to the above method examples. For example, various functional units can be divided according to various functions, or two or more functions can be integrated into one processing unit. The aforementioned integrated unit may be implemented in a form of hardware, or may be implemented in a form of a software program module. It should be noted that, the division for the units in implementations of the present disclosure is exemplary, and is merely a logical function division. There can be other divisions in an actual realization.

Figure 7:
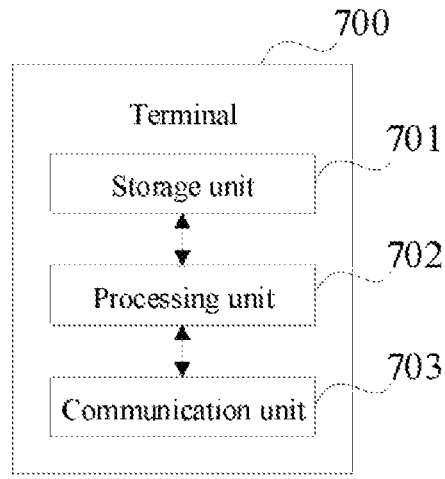
FIG. 7 is a composition block diagram of functional units of a terminal according to an implementation of the present disclosure.

In a case that an integrated unit is used, FIG. 7 illustrates a possible composition block diagram of functional units of a terminal related to the above implementations. A terminal 700 includes a processing unit 702 and a communication unit 703. The processing unit 702 is used for controlling and managing acts of the terminal. For example, the processing unit 702 is used for supporting the terminal to execute acts 202-205 in FIG. 2, acts 402-406 in FIG. 4, and/or other processes for the techniques described in this document. The communication unit 703 is used for supporting communication between the terminal and other devices, such as communication between the terminal and a network device as illustrated in FIG. 6. The terminal may further include a storage unit 701 used for storing program codes and data of the terminal.

The processing unit 702 may be a processor or a controller such as a Central Processing Unit (CPU), a general purpose processor, a Digital Signal Processor (DSP), an Application-Specific Integrated Circuit (ASIC), a Field Programmable Gate Array (FPGA), or other programmable logic device, transistor logic device, hardware component, or any combination thereof. The processing unit may implement or execute various illustrative logical blocks, modules, and circuits described in connection with the disclosure of the present disclosure. A processor may also be a combination for implementing computing functions, e.g., a combination including one or more microprocessors, a combination of a DSP and a microprocessor. The communication unit 703 may be a transceiver or a transceiving circuit. The storage unit 701 may be a memory.

The processing unit 702 is used for receiving configuration information from a network device through the communication unit 703, determining the largest number of pieces of feedback response information corresponding to one physical shared channel according the configuration information, determining a bit length of a first information field according to the largest number of pieces of the feedback response information, determining a feedback response information sequence to be transmitted in a target time unit according to the first information field, and sending the feedback response information sequence in the target time unit through the communication unit 703.

In a possible example, in an aspect of determining the largest number of pieces of feedback response information corresponding to one physical shared channel according to the configuration information, the processing unit 702 is specifically used for determining that a multi-codeword transmission mode is used in downlink according to the configuration information and determining that the largest number of pieces of the feedback response information corresponding to one physical shared channel is a maximum codeword number under the multi-codeword transmission mode.

In a possible example, the terminal uses a single-codeword transmission mode; in an aspect of determining the largest number of pieces of feedback response information corresponding to one physical shared channel according to the configuration information, the processing unit 702 is specifically used for determining the largest number of code block groups included in one transport block according to the configuration information and determining that the largest number of pieces of the feedback response information corresponding to one physical shared channel is the largest number of the code block groups included in one transport block.

In a possible example, the terminal uses the multi-codeword transmission mode; in an aspect of determining the largest number of pieces of feedback response information corresponding to one physical shared channel according to the configuration information, the processing unit 702 is specifically used for determining the largest number of code block groups included in each transport block according to the configuration information and determining that the largest number of pieces of the feedback response information corresponding to one physical shared channel is a sum of the largest number of the code block groups included in each transport block.

In a possible example, in an aspect of determining the largest number of pieces of the feedback response information corresponding to one physical shared channel according to the configuration information, the processing unit 702 is specifically used for: determining the largest number of code block groups included in one physical shared channel according to the configuration information; and determining that the largest number of pieces of the feedback response information corresponding to one physical shared channel is the largest number of the code block groups included in one physical shared channel.

In a possible example, in an aspect of determining the feedback response information sequence to be transmitted in the target time unit according to the first information field, the processing unit 702 is specifically used for: determining a bit length of the feedback response information sequence and/or a bit position, in the feedback response information sequence, of feedback response information corresponding to each physical shared channel.

In a possible example, in an aspect of determining the bit length of the first information field according to the largest number of pieces of the feedback response information, the processing unit 702 is specifically used for: if the largest number of pieces of the feedback response information corresponding to one physical shared channel is greater than or equal to a first threshold, determining that the bit length of the first information field is N bits, wherein N is a positive integer; and/or if the largest number of pieces of the feedback response information corresponding to one physical shared channel is greater than or equal to a second threshold, and less than or equal to a third threshold, determining that the bit length of the first information field is M bits, wherein M is a positive integer.

In a possible example, a default value for the bit length of the first information field is T bits, wherein T is a positive integer.

When the bit length of the first information field is N bits, T is less than or equal to N.

When the bit length of the first information field is M bits, T is less than or equal to M.

In a possible example, the first information field is a downlink allocation index (DAI) in downlink control signaling.

In a possible example, the DAI includes a total DAI and a counter DAI. The total DAI is used for determining a total bit length of the feedback response information sequence. The counter DAI is used for determining a physical downlink shared channel scheduled by downlink control signaling or a bit position, in the feedback response information sequence, of feedback response information corresponding to the downlink control signaling.

When the processing unit 702 is a processor, the communication unit 703 is a communication interface, and the storage unit 701 is a memory, a terminal related to an implementation of the present disclosure may the terminal shown in FIG. 5.

Figure 8:
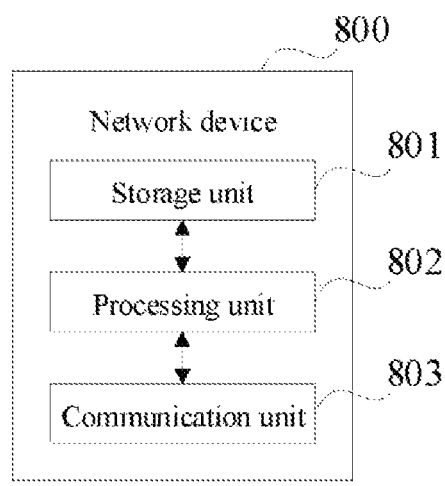
FIG. 8 is a composition block diagram of functional units of a network device according to an implementation of the present disclosure.

In a case that an integrated unit is used, FIG. 8 illustrates a possible composition block diagram of functional units of a network device related to the above implementations. A network device 800 includes a processing unit 802 and a communication unit 803. The processing unit 802 is used for controlling and managing acts of the network device. For example, the processing unit 802 is used for supporting the network device to execute acts 301-302 in FIG. 3, acts 401 and 407 in FIG. 4, and/or other processes for the techniques described in this document. The communication unit 803 is used for supporting communication between the network device and other devices, such as communication between the terminal and network device as illustrated in FIG. 5. The network device may further include a storage unit 801 used for storing program codes and data of the network device.

The processing unit 802 may be a processor or a controller, and the communication unit 803 may be a transceiver, a transceiving circuit, or a radio frequency chip. The storage unit 801 may be a memory.

The processing unit 802 is used for:

Sending, through the communication unit 803, configuration information to a terminal, wherein the configuration information is used for the terminal to determine the largest number of pieces of feedback response information corresponding to one physical shared channel, the largest number is used for determining a bit length of a first information field, and the first information field is used for determining a feedback response information sequence to be transmitted in a target time unit; and receiving, through the communication unit 803, the feedback response information sequence which is sent by the terminal in the target time unit.

In a possible example, the configuration information is used for the terminal to determine that a multi-codeword transmission mode is used in downlink, and to determine that the largest number of pieces of the feedback response information corresponding to one physical shared channel is a maximum codeword number under the multi-codeword transmission mode.

In a possible example, the terminal uses a single-codeword transmission mode; the configuration information is used for the terminal to determine the largest number of code block groups included in one transport block, and to determine that the largest number of pieces of the feedback response information corresponding to one physical shared channel is the largest number of the code block groups included in one transport block.

In a possible example, the terminal uses a multi-codeword transmission mode; the configuration information is used for the terminal to determine the largest number of code block groups included in each transport block, and to determine that the largest number of pieces of the feedback response information corresponding to one physical shared channel is a sum of the largest number of the code block groups included in each transport block.

In a possible example, the configuration information is used for the terminal to determine the largest number of code block groups included in one physical shared channel, and to determine that the largest number of pieces of the feedback response information corresponding to one physical shared channel is the largest number of the code block groups included in one physical shared channel.

In a possible example, the first information field is specifically used for determining a bit length of the feedback response information sequence in a target time unit and/or a bit position, in the feedback response information sequence, of feedback response information corresponding to each physical shared channel.

In a possible example, if the largest number of pieces of the feedback response information corresponding to one physical shared channel is greater than or equal to a first threshold, the bit length of the first information field is N bits, wherein N is a positive integer; and/or if the largest number of pieces of the feedback response information corresponding to one physical shared channel is greater than or equal to a second threshold, and less than or equal to a third threshold, the bit length of the first information field is M bits, wherein M is a positive integer.

In a possible example, a default value for the bit length of the first information field is T bits, wherein T is a positive integer; and when the bit length of the first information field is N bits, T is less than or equal to N; when the bit length of the first information field is M bits, T is less than or equal to M.

In a possible example, the first information field is a downlink allocation index (DAI) in downlink control signaling.

In a possible example, the DAI includes a total DAI and a counter DAI. The total DAI is used for determining a total bit length of the feedback response information sequence. Each counter DAI is used for determining a physical downlink shared channel scheduled in downlink control signaling or a bit position, in the feedback response information sequence, of feedback response information corresponding to the downlink control signaling.

When the processing unit 802 is a processor, the communication unit 803 is a communication interface, and the storage unit 801 is a memory, a network device related to an implementation of the present disclosure may the network device shown in FIG. 6.

Figure 9:
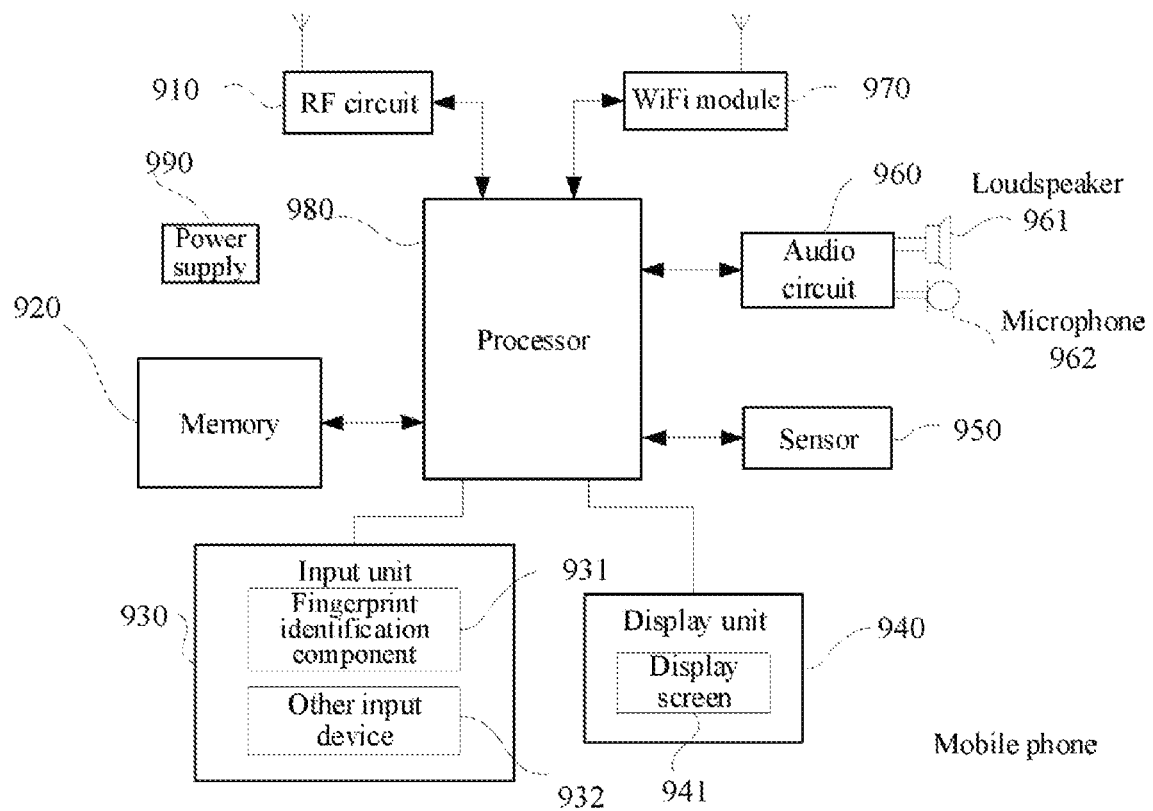
FIG. 9 is a schematic structural diagram of another terminal according to an implementation of the present disclosure.

Another terminal is further provided in an implementation of the present disclosure. As illustrated in FIG. 9, for ease of illustration, only parts related to implementations of the present disclosure are shown, and the specific technical details which are not illustrated may refer to the part of a method according to an implementation of the present disclosure. The terminal may be a mobile phone, a tablet computer, a Personal Digital Assistant (PDA), a Point of Sales (POS), a vehicle-mounted computer, or any other terminal device. For example, the terminal is a mobile phone:

FIG. 9 is a block diagram of a partial structure of a mobile phone related to a terminal provided by an implementation of the present disclosure. Referring to FIG. 9, the mobile phone includes parts such as a radio frequency (RF) circuit 910, a memory 920, an input unit 930, a display unit 940, a sensor 950, an audio circuit 960, a wireless fidelity (WiFi) module 970, a processor 980, and a power supply 990. A person skilled in the art may understand that the structure of the mobile phone shown in FIG. 9 does not constitute a limitation to the mobile phone, and the mobile phone may include more parts or fewer parts than those shown in the figure, or some parts may be combined, or a different part arrangement may be used.

In the following, each composition part of the mobile phone is specifically described with reference to FIG. 9.

The RF circuit 910 may be used to receive and send information. Generally, the RF circuit 910 includes, but is not limited to, an antenna, at least one amplifier, a transceiver, a coupler, a Low Noise Amplifier (LNA), a duplexer, and the like. In addition, the RF circuit 910 may further communicate with a network and another device via wireless communication. The wireless communication may use any communication standard or protocol, which includes, but is not limited to, a Global System for Mobile Communication (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 920 may be used for storing software programs and modules, and the processor 980 runs the software programs and modules stored in the memory 920 to execute various functional applications and data processing of the mobile phone. The memory 920 may mainly include a program storage area and a data storage area. The program storage area may store an operating system, at least one application program required by a function, and the like. The data storage area may store data created according to use of the mobile phone. In addition, the memory 920 may include a high speed random access memory, and may also include a non-volatile memory, such as at least one magnetic disk storage device, a flash memory, or other volatile solid-state storage device.

The input unit 930 may be configured to receive an input number or character information, and generate a key signal input related to the user setting and function control of the mobile phone. Specifically, the input unit 930 may include a fingerprint identification component 931 and other input device 932. The fingerprint identification component 931 may collect fingerprint data inputted by the user thereon. Besides the fingerprint identification component 931, the input unit 930 may further include other input device 932. Specifically, the other input devices 932 may include, but is not limited to, one or more of a touch control screen, a physical keyboard, a function key (for example, a volume control key, or a switch key), a track ball, a mouse, a joystick, and so on.

The display unit 940 may be used for displaying information input by the user or information provided for the user, and various menus of the mobile phone. The display unit 940 may include a display screen 941. Optionally, the display screen 941 may be configured by a Liquid Crystal Display (LCD), an Organic Light-Emitting Diode (OLED), or the like. Although the fingerprint identification component 931 and the display screen 941 in FIG. 9 are used as two separate parts to realize the input and output function of the mobile phone, in some implementations, the fingerprint identification component 931 and the display screen 941 may be integrated to realize the input function and playing function of the mobile phone.

The mobile phone may further include at least one sensor 950, such as an optical sensor, a motion sensor or other sensor. Specifically, the optical sensor may include an ambient light sensor and a proximity sensor, where the ambient light sensor may adjust the luminance of the display screen 941 according to brightness of the ambient light, and the proximity sensor may turn off the display screen 941 and/or backlight when the mobile phone is moved to the ear. As one type of the motion sensor, a gravity acceleration sensor may detect the magnitudes of accelerations in various directions (generally triaxial), may detect the magnitude and direction of the gravity when the sensor is still, may be used in an application for identifying a gesture of a mobile phone (for example, switching between landscape and portrait, related games, and gesture calibration of a magnetometer), and a function related to vibration identification (such as a pedometer and a tap). Other sensors, for example, a gyroscope, a barometer, a hygrometer, a thermometer, and an infrared sensor, which may be configured in the mobile phone are not further described herein.

An audio circuit 960, a loudspeaker 961, and a microphone 962 may provide audio interfaces between the user and the mobile phone. The audio circuit 960 may transmit, to the loudspeaker 961, an electric signal converted from received audio data. The loudspeaker 961 converts the electrical signal into a sound signal for playing. On the other hand, the microphone 962 converts a collected sound signal into an electrical signal. The audio circuit 960 receives the electrical signal and converts the electrical signal into audio data, the audio data are played to the processor 980 for processing. The audio data are sent to another mobile phone through the RF circuit 910, or the audio data are played to the memory 920 for further processing.

WiFi belongs to a short range wireless transmission technology. The mobile phone may help, by using a WiFi module 970, the user to receive and send an e-mail, browse a webpage, access a streaming medium, and the like, and WiFi provides the user with wireless broadband Internet access. Although FIG. 9 shows the WiFi module 970, it may be understood that, the WiFi module 970 is not an essential part of the mobile phone, and can be completely omitted as required without changing the essence of the present disclosure.

The processor 980 is a control center of the mobile phone, and connects various parts of a whole mobile phone by using various interfaces and circuits. By running or executing software programs and/or modules stored in the memory 920 and invoking data stored in the memory 920, the processor 980 performs various functions of the mobile phone and processes data, thereby performing overall monitoring on the mobile phone. Optionally, the processor 980 may include one or more processing units. Preferably, the processor 980 may integrate an application processor and a modem processor. The application processor mainly processes an operating system, a user interface, an application program, and the like, and the modem processor mainly processes wireless communication. It may be understood that, the foregoing modem processor may be not integrated into the processor 980.

The mobile phone further includes the power supply 990 (such as a battery) for supplying power to each part. Preferably, the power supply may be logically connected to the processor 980 by using a power management system, thereby implementing functions such as charging, discharging, and power consumption management by using the power management system.

Although not shown in the figure, the mobile phone may further include a camera, a Bluetooth module, and the like, which are not further described herein.

In the foregoing implementations shown in FIG. 2 to FIG. 4, the flow at the terminal side in each act method can be implemented based on the structure of the mobile phone.

In the foregoing implementations shown in FIG. 5 and FIG. 6, the function of each unit can be implemented based on the structure of the mobile phone.

An implementation of the present disclosure further provides a computer readable storage medium. The computer readable storage medium stores computer programs used for exchanging digital data. The computer programs enable a computer to execute all or part of acts described for the terminal in the above method implementations.

An implementation of the present disclosure further provides a computer readable storage medium. The computer readable storage medium stores computer programs used for exchanging digital data. The computer programs enable a computer to execute all or part of acts described for the network device in the above method implementations.

An implementation of the present disclosure also provides a computer program product. The computer program product includes a non-transitory computer-readable medium storing computer programs. The computer programs are operable to enable a computer to execute all or part of acts described for the terminal in the above method implementations. The computer program product may be a software installation package.

An implementation of the present disclosure also provides a computer program product. The computer program product includes a non-transitory computer-readable medium storing computer programs. The computer programs are operable to enable a computer to execute all or part of acts described for the network device in the above methods. The computer program product may be a software installation package.

The acts of the method or algorithm described in implementations of the present disclosure may be implemented in hardware, or implemented in a manner of executing software instructions by a processor. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An exemplary storage medium is coupled to the processor such that the processor can read information from a storage medium, and write information to the storage medium. Of course, the storage medium may be a component of the processor. The processor and the storage medium may be located in an ASIC. In addition, the ASIC may be located in an access network device, a target network device or a core network device. Of course, the processor and the storage medium may be located as discrete components in an access network device, a target network device or a core network device.

Those skilled in the art should realize that, in one or more examples described above, the functions described in implementations of the present disclosure may be implemented, in whole or in part, via software, hardware, firmware or any combination thereof. When implemented in software, the functions may be implemented, in whole or in part, in the form of a computer program product. The computer program product includes one or more computer instructions. When the computer program instructions are loaded and executed on a computer, the flows or functions described in accordance with implementations of the present disclosure are generated in whole or in part. The computer can be a general purpose computer, a special purpose computer, a computer network, or other programmable device. The computer instructions may be stored in a computer readable storage medium or transferred from one computer readable storage medium to another computer readable storage medium. For example, the computer instructions can be transferred from a website site, computer, server or data center to another website site, computer, server, or data center by wire (e.g., coaxial cable, fiber optic, digital subscriber line (DSL)), or wireless (e.g., infrared, wireless, microwave, etc.). The computer readable storage medium may be any available media that may be accessed by a computer, or a data storage device such as a server, or a data center that includes one or more available media integrated. The available medium may be a magnetic medium (e.g., a floppy disk, a hard disk, a magnetic tape), an optical medium (e.g., a DVD), or a semiconductor medium such as a solid state disk (SSD) or the like.

The objectives, technical solutions, and benefits of implementations of the present disclosure are further described in detail in the foregoing specific realization modes. It should be understood that the foregoing descriptions are merely specific realization modes of implementations of the present disclosure, but are not intended to limit the protection scope of the implementations of the present disclosure. Any modification, equivalent replacement, or improvement based on technical solutions of implementations of the present disclosure shall fall into the protection scope of implementations of the present disclosure.

What I claim is:

1. A method for transmitting feedback response information, comprising:
    receiving, by a terminal, configuration information from a network device;
    determining, by the terminal, a largest number of pieces of feedback response information corresponding to one physical shared channel according to the configuration information;
    determining, by the terminal, a bit length of a first information field according to the largest number of pieces of the feedback response information, wherein the first information field is received according to the determined bit length;

determining, by the terminal, a feedback response information sequence to be transmitted in a target time unit according to the first information field; and sending, by the terminal, the feedback response information sequence in the target time unit, wherein determining, by the terminal, the bit length of the first information field in the downlink control signaling according to the largest number of pieces of the feedback response information comprises:

determining that the bit length of the first information field is N bits when the largest number of pieces of the feedback response information corresponding to the one physical shared channel is greater than or equal to a first threshold, wherein N is a positive integer.

2. The method of claim 1, wherein determining, by the terminal, the largest number of pieces of the feedback response information corresponding to the one physical shared channel according to the configuration information, comprises:

determining, by the terminal, that a multi-codeword transmission mode is used in downlink according to the configuration information; and determining, by the terminal, that the largest number of pieces of the feedback response information corresponding to the one physical shared channel is a maximum codeword number under the multi-codeword transmission mode.

3. The method of claim 1, wherein the terminal uses a single-codeword transmission mode; and wherein determining, by the terminal, the largest number of pieces of the feedback response information corresponding to the one physical shared channel according to the configuration information, comprises:

determining, by the terminal, a largest number of code block groups comprised in one transport block according to the configuration information; and determining, by the terminal, that the largest number of pieces of the feedback response information corresponding to the one physical shared channel is the largest number of the code block groups comprised in one transport block.

4. The method of claim 1, wherein the terminal uses a multi-codeword transmission mode; and wherein determining, by the terminal, the largest number of pieces of the feedback response information corresponding to the one physical shared channel according to the configuration information, comprises:

determining, by the terminal, a largest number of code block groups comprised in each transport block according to the configuration information; and determining, by the terminal, that the largest number of pieces of the feedback response information corresponding to the one physical shared channel is a sum of the largest number of the code block groups comprised in each transport block.

5. The method of claim 1, wherein a default value for the bit length of the first information field is T bits, wherein T is a positive integer; and when the bit length of the first information field is N bits, T is less than or equal to N.

6. A terminal, comprising: a processor and a transceiver; wherein the transceiver is configured to receive configuration information from a network device; and wherein the processor is configured to:

determine a largest number of pieces of feedback response information corresponding to one physical shared channel according to the configuration information;

determine a bit length of a first information field according to the largest number of pieces of the feedback response information, wherein the first information field is received according to the determined bit length, wherein when the largest number of pieces of the feedback response information corresponding to the one physical shared channel is greater than or equal to a first threshold, the bit length of the first information field is determined to be N bits, and wherein N is a positive integer; and determine a feedback response information sequence to be transmitted in a target time unit according to the first information field; and the transceiver is further configured to send the feedback response information sequence in the target time unit.

7. The terminal of claim 6, wherein the processor is configured to determine the largest number of pieces of the feedback response information corresponding to the one physical shared channel according to the configuration information, comprising:

determining that a multi-codeword transmission mode is used in downlink according to the configuration information; and determining that the largest number of pieces of the feedback response information corresponding to the one physical shared channel is a maximum codeword number under the multi-codeword transmission mode.

8. The terminal of claim 6, wherein the terminal uses a single-codeword transmission mode; and the processor is configured to determine the largest number of pieces of the feedback response information corresponding to the one physical shared channel according to the configuration information, comprising:

determining a largest number of code block groups comprised in one transport block according to the configuration information; and determining that the largest number of pieces of the feedback response information corresponding to the one physical shared channel is the largest number of the code block groups comprised in one transport block.

9. The terminal of claim 6, wherein the terminal uses a multi-codeword transmission mode; and the processor is configured to determine the largest number of pieces of the feedback response information corresponding to the one physical shared channel according to the configuration information, comprising:

determining a largest number of code block groups comprised in each transport block according to the configuration information; and determining that the largest number of pieces of the feedback response information corresponding to the one physical shared channel is a sum of the largest number of the code block groups comprised in each transport block.

10. The terminal of claim 6, wherein a default value for the bit length of the first information field is T bits, wherein T is a positive integer; and when the bit length of the first information field is N bits, T is less than or equal to N.

11. A network device, comprising:

a transceiver; and a processor, wherein the processor is configured to:

send, through the transceiver, configuration information to a terminal, the configuration information is used for the terminal to determine a largest number of pieces of feedback response information corresponding to one physical shared channel, wherein the largest number is used for determining a bit length of a first information field, wherein the first information field is received according to the determined bit length, wherein when the largest number of pieces of the feedback response information corresponding to the one physical shared channel is greater than or equal to a first threshold, the bit length of the first information field is determined to be N bits, and wherein N is a positive integer; and receive, through the transceiver, the feedback response information sequence that is sent by the terminal in a target time unit.

12. The network device of claim 11, wherein the configuration information is used for the terminal to determine that a multi-codeword transmission mode is used in downlink and to determine that the largest number of pieces of the feedback response information corresponding to the one physical shared channel is a maximum codeword number under the multi-codeword transmission mode.

13. The network device of claim 11, wherein a single-codeword transmission mode is used, and wherein the configuration information is used for the terminal to determine a largest number of code block groups comprised in one transport block and to determine that the largest number of pieces of the feedback response information corresponding to the one physical shared channel is the largest number of the code block groups comprised in one transport block.

14. The network device of claim 11, wherein a multi-codeword transmission mode is used, and wherein the configuration information is used for the terminal to determine a largest number of code block groups comprised in each transport block and to determine that the largest number of pieces of the feedback response information corresponding to the one physical shared channel is a sum of the largest number of the code block groups comprised in each transport block.

15. The network device of claim 11, wherein a default value for the bit length of the first information field is T bits, T is a positive integer; wherein when the bit length of the first information field is N bits, T is less than or equal to N.

* * * * *